(12) United States Patent
Maratta et al.

(10) Patent No.: US 7,892,461 B2
(45) Date of Patent: Feb. 22, 2011

(54) METHOD FOR THE PRODUCTION AND USE OF PIGMENTED THERMOPLASTIC MATERIAL COMPRISING A FLOW ENHANCER IN THE FORM OF A DISSOLVED SALT

(75) Inventors: Gerard E. Maratta, Staten Island, NY (US); Rainer Heubach, Grossgmain (AT)

(73) Assignee: Heubach GmbH, Langelsheim (DE)

( * ) Notice: Subject to any disclaimer, the term of this patent is extended or adjusted under 35 U.S.C. 154(b) by 905 days.

(21) Appl. No.: 11/592,418

(22) Filed: Nov. 3, 2006

(65) Prior Publication Data

US 2007/0191511 A1 Aug. 16, 2007

(51) Int. Cl.
*B29B 13/10* (2006.01)
*D01D 10/02* (2006.01)

(52) U.S. Cl. ............... 264/5; 264/78; 264/140; 264/141; 264/345

(58) Field of Classification Search ........... 106/493, 106/495, 500; 264/5, 13, 345
See application file for complete search history.

(56) References Cited

U.S. PATENT DOCUMENTS

| | | | | |
|---|---|---|---|---|
| 3,615,812 A * | 10/1971 | Clark et al. | ............. | 106/493 |
| 3,696,101 A * | 10/1972 | Litt et al. | ............. | 544/220 |
| 4,194,920 A * | 3/1980 | Burke et al. | ............. | 523/200 |
| 4,369,272 A * | 1/1983 | Jaffe | ............. | 524/88 |
| 4,474,473 A * | 10/1984 | Higuchi et al. | ............. | 366/75 |
| 4,909,853 A * | 3/1990 | Wienkenhover et al. | .... | 106/503 |
| 5,236,645 A * | 8/1993 | Jones | ............. | 264/78 |
| 5,236,654 A | 8/1993 | Adams et al. | | |
| 5,326,576 A * | 7/1994 | Zuege | ............. | 426/107 |
| 5,383,966 A * | 1/1995 | Johnson | ............. | 106/495 |
| 5,443,775 A * | 8/1995 | Brannon | ............. | 264/143 |
| 5,626,662 A * | 5/1997 | Urban | ............. | 106/497 |
| 5,800,607 A * | 9/1998 | Schnaitmann et al. | ....... | 106/412 |
| 6,001,168 A * | 12/1999 | Hall-Goulle et al. | ........ | 106/496 |
| 6,149,850 A | 11/2000 | Gannon | | |
| 6,273,559 B1 * | 8/2001 | Vago et al. | ............. | 347/74 |
| 6,273,599 B1 * | 8/2001 | Affeldt et al. | ............. | 366/76.1 |
| 6,348,091 B1 * | 2/2002 | Affeldt et al. | ............. | 106/504 |
| 6,422,732 B1 * | 7/2002 | Maris | ............. | 366/75 |
| 6,440,207 B1 * | 8/2002 | Schulz | ............. | 106/412 |
| 6,582,508 B2 * | 6/2003 | Dietz et al. | ............. | 106/493 |
| 6,767,397 B2 * | 7/2004 | Anantharaman et al. | .... | 106/493 |
| 6,784,231 B2 | 8/2004 | Shimada et al. | | |
| 7,056,378 B2 * | 6/2006 | Weber et al. | ............. | 106/493 |
| 7,658,793 B2 * | 2/2010 | Heubach et al. | ............. | 106/493 |
| 2004/0192849 A1 | 9/2004 | Gaukroger | | |
| 2007/0079728 A1 * | 4/2007 | Heubach et al. | ............. | 106/31.6 |
| 2007/0182053 A1 * | 8/2007 | Hoellein et al. | ............. | 264/141 |

FOREIGN PATENT DOCUMENTS

| | | |
|---|---|---|
| DE | 691 24 560 | 5/1997 |
| DE | 103 35863 A1 * | 3/2005 |
| EP | 0 477 634 | 4/1992 |
| JP | 04-339877 | 11/1992 |
| WO | WO 2005 017003 A1 * | 2/2005 |

* cited by examiner

Primary Examiner—H. (Holly) T Le
(74) Attorney, Agent, or Firm—Fay Sharpe LLP

(57) ABSTRACT

Description of a method for the production of a pigmented thermoplastic material. The method characterizes that during a first step an aqueous suspension presenting a solid matter contents of approximately 10 to 75% by weight, containing at least one flow enhancer in form of dissolved salt and the pigment, is ground under alkaline conditions in a high energy charging mill by means of grinding bodies having a diameter of 0.2 to 2 mm, and the obtained grinding product is transformed during a second step with a thermoplastic material into the pigmented thermoplastic material by means of a flush process performed by a kneader or extruder, at increased temperature and a pH value of initially 7 or less. In addition, the invention concerns a pigmented thermoplastic material produced according to said method, as well as beneficial applications for production of transparent molded bodies, in particular of fibers, foils, injection moldings and extruded parts. The invention-specific method provides pigmented plastic material which can reliably be processed into high quality products. Foils which are produced accordingly are, for example, free from coloration defects.

19 Claims, No Drawings

METHOD FOR THE PRODUCTION AND USE OF PIGMENTED THERMOPLASTIC MATERIAL COMPRISING A FLOW ENHANCER IN THE FORM OF A DISSOLVED SALT

This application claims the priority benefit of German application No. DE 10 2005 052 761.2, filed Nov. 4, 2005, the disclosure of which is incorporated herein by reference.

BACKGROUND OF INVENTION

The invention relates to a pigmented thermoplastic material, a method for its production as well as its use for production of transparent shaped bodies.

With the traditional methods for production of pigmented thermoplastic material, pigment in form of powder is usually employed. This entails process-technical drawbacks, since it is necessary to add, for dispersion of powdery pigments in the thermoplastic material, dispersing adjuvants, such as waxes, oils or stearates. The addition of such adjuvants may lead to processing problems as well as loss of quality in the end product. Also, by adding these adjuvants, it is not possible to definitely assure that optimum dispersion will be achieved. Another drawback related to the use of powder pigments for production of highly pigmented pigment master batches is their low bulk-density during direct processing in the extruder.

From U.S. Pat. No. 4,474,473 and U.S. Pat. No. 6,273,599 continuous flushing methods are known of pigments in which aqueous pigment press cakes are converted to a hydrophobic organic phase. The thus developing free-flowing pigment dispersions are, however, only suitable for application in printing inks and paints.

The aforementioned problems in regard to the addition of dispersion adjuvants are solved, at least partially, by a method described in DE 103 35 863 A1. By using a specific extrusion method, it is possible to reduce the amount of dispersion adjuvants. To that end, it is suggested in DE 103 35 863 A1 that a pigment master batch is produced in that a thermoplastic polymer in the form of granulate or powder is continuously dosed into a twin-screw extruder, whereby the dosed-in polymer is melted in the extruder.

In addition, a pumpable pigment press-cake which contains 5 to 35% of pigment by weight, water and/or organic solvent, is continuously dosed under increased pressure into the melted polymer in the extruder. The pressure is hereby so high that the boiling temperature of the water and/or of the organic solvent is higher than the internal temperature of the extruder in the area of the inlet aperture of the extruder. The pigment is dispersed in the extruder from the press-cake into the polymer melt by the effect of shearing forces. The water and/or the organic solvents are removed under increased pressure through an outlet aperture of the extruder, whereby the pressure is so high that the boiling temperature of the water and/or of the organic solvent is higher than the internal temperature of the extruder in the area of the outlet aperture. Finally, the pigmented polymer melt is discharged from the extruder, cooled down and granulated.

This known method involves a continuous method, in which it matters that the pigment press cake and the water and/or the organic solvent are introduced under increased pressure into the extruder or discharged from the extruder. It permits the break-up of larger pigment agglomerations in the extruder by means of shearing force effect. However, the shearing forces in the extruder are far from being forceful enough to adequately comminute all agglomerates or coarse-grained pigment particles. Even smallest portions of coarse-grained pigment particles or agglomerates in the production of spinning fibers reduce the stability of the threads, which may result in their breaking off and, in the extreme case, even in clogging of the fine nozzles. In case of foils, the coarse-grained pigment particles lead to so-called "oversize particles" (ripening) which, in turn, entail color imperfections (pin holes) of thin-film foils. For that reason, this method cannot be used to produce flushes which are suitable for the production of spinning fibers and thin-film foils.

BRIEF SUMMARY OF INVENTION

It is therefore the object of the invention to provide a method for production of pigmented thermoplastic material which permits reliable further processing into high quality products, such as thin film foils or spinning fibers. In addition, mention will be made of beneficial utilization of the material obtained with the method, as well as of a foil which is essentially free from color defects.

In regard to the method for production of pigmented thermoplastic material, this object is solved in that in a first step an aqueous suspension, having a solid matter contents of approximately 10 to 75% by weight, which contains at least one flow improver in the form of a dissolved salt and a pigment, is ground down, under alkaline conditions in a high energy feed mill with grinding bodies of 0.2 to 2 mm diameter, and the obtained grinding product is converted in a second step by means of a flush method executed by a kneading unit or extruder, under increased temperature and a pH value of initially 7 or less, with a thermoplastic material into the pigmented thermoplastic material.

Accordingly, in a first step, a suspension comprising at least one pigment and at least one adjuvant enhancing the flow behavior and/or the plasticity, is ground down in a high-energy feed mill. In a second step, the grinding product obtained in the first step is converted within the setting of a flush method, into a pigmented thermoplastic material. It is preferred that the pH value in the second step is adjusted to approximately 2 to 6, in particular to 2.8 and 4.5. In addition, it may be advantageous if, towards the end of the second step the pH value is adjusted with bases to approximately 8 to 10, in particular to approximately 8.5 to 9.5, in order to be able to remove excess integrated species in water-soluble form.

In the execution of the second step according to the inventive method, either a kneading unit can be employed or also an extruder. Preferred is a kneading unit, in particular a heatable duel shaft kneader, whereby the grinding product is introduced from the first step in several charges into the kneader and, in particular, after each charge, upon occurrence of a phase separation, excess aqueous phase is decanted. It is appropriate that in said second step the temperature of the material contained in the kneader be increased in order to remove from the pigmented thermoplastic material any residual more difficult to dissolve, interfering substances. This involves, for example, the following unwelcome substances: phthalic acid (derivatives), salts, in particular residual concentrations of mineral salts and/or "inner salts" as well as of multi-base and/or higher fatty acids, phosphonic acid, sulphonic or amino acids.

Furthermore, during the second step and/or the flush process, it is preferred if the temperature is adjusted to 100° C. or lower, in particular to approximately 85 to 95° C.

During the second step or during execution of the flush process, it is of benefit, within the framework of the invention, in particular with use of a kneader, that this step is performed under reduced pressure, in particular without any pressure.

When implementing the inventive method, the selection of the thermoplastic material is not subject to any critical limitation. However, it is preferred that by way of thermoplastic material, use is made of polyethylene (PE), in particular high pressure polyethylene (HDPE) or low pressure polyethylene (LPPE), polypropylene (PP), polyvinylchloride (PVC) ethylene-methcryl-acid-ester copolymer (EMA), polystyrene (PS), polyacryl-nitrile (PAN) or polyester (Diolen®).

In addition, it is preferred if an untreated raw pigment is used during the first step. All organic pigments having basic hydrophobic or lipophilic surface property can be employed. These include for instance all phthalocyanine-, quinacridone-, perylene-, perinon-, anthraquinon-, amino- and hydroxyanthraquinon-, indathron-, flavanthron-, anthranthron-, isoviolanthron-, diketopyrrolopyrrol-, dioxazin-, thioindigo-, quinophthalon-, isoindolinon- and isoindolin pigments, also quinoxalindion- and benzimidazolon-Azo-pigments and phthalimidylazo-pigments, disazo-pigments, such as diarylid-, bisacetoacetarylid, disazopyrazolon- or disazo-condensation pigments, azo pigments such as β-naphthol pigments, naphthol AS-pigments, monoazo-yellow pigments, metal complex pigments and triphenylmethane salt pigments, as well as suitable mixtures, composites and crystalline mixed phases ("solid solutions") of these pigments. In principle, all organic pigments can be employed whose stability agrees with the application field of the matrix and which withstand the requirements of the flush-kneader process. These latter conditions are essentially predetermined by the range of the softening temperature of the thermoplastic material.

In addition, all organic pigments can be used which can be employed, essentially without metal abrasion, in an instrument for the flushing process, following production of the grain-stable grinding suspension. Average grain hardness is hereby of benefit as an expression of lattice energy, which causes neither a tendency for agglomeration or new formation of crystals, nor an excessive abrasion to the instruments to be employed in accordance with the invention. To be given consideration to that end are mainly pigments such as barium sulfate, lithopone, lead chromate or cerium sulfide, possibly also pigments based on the corundum structure, if abrasion stays within acceptable limits. Within the scope of the invention, it is of particular benefit, at least in individual instances, if use is made of a raw, not yet pigmentary application-ready pigment or of a highly amorphous pigment or mixtures of several of this type of raw pigments.

In addition, it is preferred if during the first step of the grinding process, the particle size of the pigment is adjusted to smaller than 150 nm, in particular smaller than 120 nm. In the execution of the inventive method, it is also beneficial that part of the thermoplastic material to be pigmented is ground down together with the pigment in the ball mill during the first step to a common average grain diameter of 20 to 200 nm, in particular of 80 to 150 nm, with a half-value width of grain distribution below 50 nm. The concentration of the pigment in the aqueous suspension is beneficially adjusted in such manner during the first step so that with addition of the thermoplastic material during the second step, there will be a ratio of 1 part of weight of thermoplastic material to approximately 0.2 to 4 parts of pigment weight, in particular approximately 1 to 3 parts of pigment weight. In addition, it is considered as beneficial if the solid body percentage is adjusted during the first step to approximately 30 to 75 percent by weight, in particular to approximately 50 to 75% by weight.

It is necessary for execution of the inventive method that a flow enhancer be employed. The term "flow enhancer" is familiar to a person skilled in the art. This involves an additive which promotes the flow behavior and/or the plasticity of the suspension treated according to the invention during the first step. For that purpose, the flow enhancer is added during the first step of the inventive method. Preferred are hereby: sodium lauryl sulfonate, in particular jointly with a de-foamer for adjustment of desired surface tension, modified sunflower oil (Edenor ES), in particular in interaction with an oil such as mineral oil PKWF, fatty acid sodium salt DT30, sodium salt of oleic acid, azelaic acid, in particular in interaction with an oil, such as mineral oil PKWF, dresinate (saponified colophonium resin, containing Na-salt of the dehydro abietic acid) in particular in interaction with mineral oil PKWF, in particular with use of organic pigments, as well as naphthaline formaldehyde-sulfonate condensate and/or melamine-formaldehyde-sulfonate condensate, in particular with use of inorganic pigments. The amount of the flow enhancer is not subject to any critical limitations within the scope of the invention.

It is beneficial if same is adjusted in the aqueous suspension during the first step to a concentration of 0.2 to 20% by weight, in particular to 2 to 10% by weight.

Object of the invention is not only the method described in detail above, but also the therewith obtained pigmented thermoplastic material, whereby the therein contained pigments present an average grain diameter of less than 200 nm, in particular less than 150 nm, with a half value width of grain distribution of less than 80 nm. It is particularly preferred if the average grain diameter of the pigments comes to less than 50 nm and less than 100, nm with a half value width of grain distribution.

The inventive, pigmented thermoplastic material can be used for many applications, in particular it is suitable for the production of transparent shaped bodies, in particular of fibers, foils, extruded blanks and extruded pieces.

The invention is explained in more detail below.

DETAILED DESCRIPTION OF INVENTION

In the execution of the inventive method, esters and glycerides can be employed for its optimization, which are hydrolyzed in controlled fashion by adjustment of pH-value during the process and their effect can thus be modified. This involves in particular palmic acid glyceride, stearic acid glyceride, triglycerol-di-isostearate and/or ethyllinoleate. In addition, other adjuvants may be employed for control of the process, in particular substances which enhance the affinity between pigment and lipophile phase or the moldability of the thermoplastic material, which includes specifically acenaphthene, mesitylene, xylene, naphthalene, solvent facilitating agents, in particular 2-methyl-1-propanol, cyclohexanol and/or cetylalcohol, as well as different oils together with employed fatty acids, in particular in the form of mineral oil PKWF, linseed oil and hydrated oil of ricinus.

Plasticity enhancers can also be beneficially employed within the scope of the invention, in particular palmic acid glyceride, stearic acid glyceride, tri-glycerol-diisostearate, ethyllinoleate (Edenor EL 80), as well as polyethylene waxes (for example Licowax PE520 produced by Messrs. Clariant). Also, beneficial use can be made of buffer substances on hydrophilic/lipophilic base (among others "solvent facilitating substances") in the form of 2-methyl-1-propanol, cyclohexanol and/or cetyl alcohol. Together with certain fatty acid derivatives and waxes, beneficial use is also made of oils, such as mineral oil PKWF 4/7, linseed oil and hydrated oil of ricinus (HCO).

In contrast to the single-stage method described in DE 103 35 863 A1, the inventive method is based on a two-stage process and thus distinguishes itself fundamentally from the known method. In said known method, a flow enhancer is used, which, however, is added directly to the extruder. It is thus proven that the core of the invention significantly differs from the earlier described state of the art according to DE 103 35 863 A1.

The superior quality of the thermoplastic material that can be produced with the invention-specific method is essentially attributable to the use of high-energy charging mills for grinding of the suspension. High-energy charging mills are also known under the term "micro-media mills" with high output density. The term "high-energy charging mill" signifies a mill which not only permits grinding of agglomerates but also of individual pigment particles, in such manner that particle sizes can be adjusted to smaller than 200 nm, in particular smaller than 150 nm and even smaller than 120 nm. The diameter of the grinding bodies of said high-energy charging mills ranges specifically between 0.2 and 2 mm. Such mills require a charge of rheologically optimized pastes having their viscosity adapted to the micro-media grinding process. The requirements in regard to flow behavior and plasticity are not satisfied by an ordinary pigment press cake, not even if it is diluted with water. It is the invention-specific method which permits the use of high-energy charging mills for the production of pigmented thermoplastic material, namely in that a flow-behavior or plasticity enhancing additive is added to the suspension, with further additions of other substances not being excluded. The grinding product obtained by the prior grinding step is then converted according to the invention within the overall flush-process into a pigmented thermoplastic material.

A decisive advantage of the inventive two-stage method lies in the fact that the process-related high energy charge via the high output charging mill is sufficient to be able to grind even primary particles of pigments, i.e. not only agglomerates. This makes it possible to employ unfinished pigments, so-called "crudes" which can be obtained at a much lower price than finished pigments. As a result, it is possible to directly produce said preparation from a non-pigmentary crude pigment. The inventive, low-cost two-stage method results in significant economic savings because the extremely expensive pigment finish-process is eliminated, while, at the same time, the preparation presents the highest qualities.

Another benefit in connection with addition of flow-capacity or plasticity promoting additive or additives lies in the circumstance that the pigment percentage in the suspension or dispersion can be significantly increased, as a result of which it is possible to fully exploit the output of the mills relative to their through-put and also relative to the targeted quality. Moreover, another benefit of the inventive method consists in that any re-agglomeration of already very finely ground pigment particles will not occur based on the development of van der Waal's forces, because these forces are eliminated by the presence of the additives or additive. Thus, already prior to the onset of the flush process itself, the optimum particle size is attained for subsequent processing of plastic material and it is retained within the scope of the flush method by the presence of the additives until wetting takes place with the plastic carrier material. Particularly advantageous examples, which are not all simultaneously suitable are, for example Jagsperse EC® (de-foaming agent; adjustment of surface tension) together with sodium lauryl sulfonate, for example. De-foaming agents are frequently employed to advantage in order to reduce the formation of foam as a side effect of the invention-specific essential flow enhancers without interfering with their interaction with the employed pigments.

During the second step, the pH-value is preferably adjusted in such manner within the scope of the flush process that at least part of the flow behavior or the plasticity enhancing additives or additive precipitate as salt. This results in a particularly simple purification of the material. The precipitated salt can be dissolved in the process water separated by the flush process and carried away by drainage of the process water.

It has been proven as particularly beneficial if, within the scope of the flush process, the following materials are selectively added: PE, in particular LDPE or HDPE together with a PE wax, PVC, PP, EMA, PS, PAN or Diolen®.

The flush process can beneficially be executed with the use of at least one kneading device or extruder. The flush process can take place with exertion of pressure, in particular with the use of a kneading device. In addition, process temperature during the flush procedure can be adjusted to 100° C. Due to the essentially pressure-free and/or up to approximately 100° C. temperature limit processing of the material, specifically in the kneader or the extruder, subsequent re-crystallization or re-agglomeration is prevented in the employed thermoplastic pre-matrix.

In addition, a raw pigment can be used during the first step, resulting in significantly lower costs for producing the pigmented thermoplastic material. The suspension employed in the first step can be adjusted to a solid body percentage ranging between 30 and 75%, in particular between 45 and 65%. Due to the addition of additives which enhance the flow behavior and the plasticity, the solid body percentages may vary over a wide range and can specifically be increased beyond the upper limits which were previously possible in the state of the art.

In a particular preferred embodiment, a particle size is specified during grinding of less than 200 nm, in particular less than 150 nm, in particular less than 120 nm. The aforementioned upper limits signify the position of the distribution maximum. Thus, the pigments are clearly brought in size below the half wave length of the transmitted or remitted visual impression and consequently no longer provide refractive color impressions but instead filter out only by means of adsorption the complementary color of the color impression. Otherwise, the pigments are transparent. That effect is increased with declining average particle size. In addition, it turned out that below a particle size of 150 nm, transparent foils, fibers, injection moldings and extruded pieces can be produced without trouble, since it is possible to make a product free from oversize pieces.

The pigmented thermoplastic material obtainable with the inventive method can therefore be employed particularly well for the manufacture of pigmented foils or spinning fibers. Another to be mentioned benefit for the manufacture and processing results from testing the viscosity behavior of the thermoplastic material master batch according to perforated disk baffle plate procedure, which is presented here in more detail as an example of a test (ASTM standardization objective not yet completed):

In summary, following are the benefits from application of the inventive method.

The attainable particle size distribution of the synthetic material formulation (master batch) leads to superior properties in the end product, in particular in regard to transparency, absence of shrink holes and pits, mechanical stability and purity of color of fibers, foils, injection moldings and extruded pieces. In addition, the inventive method permits optimal integration of all types of additives during the dispersive phase with uniform distribution or coverage and potential reaction between reactive "fresh" pigment surface (or fracture surface) and reactive additives already in the aqueous environment with high percentage of solid matter. It is thus possible to effectively prevent uncontrolled crystal growth. These adjuvants can be removed again during flushing by appropriate control of the pH value in the aqueous phase, or they can be converted into types which will further stabilize the pigments in the matrix. In comparison with the known method, there are significant reductions in cost. In addition, a broader raw material basis is available for the manufacture of the thermoplastic material. A separate finishing process can be completely avoided, inasmuch as the grinding slurry or grinding product is charged directly into the kneader or extruder. Master batches obtainable with the inventive method are storage-stable, even at increased environmental temperatures, with respect to subsequent re-crystallization or disintegration.

The invention is explained in more detail below, making use of two exemplary embodiments. These embodiments are, by no means, of limitative nature for the invention. All percentage specifications, unless otherwise expressly stated, relate to mass percent, 100% pertains to total formulation.

EXAMPLES

In the two exemplary embodiments described hereinafter, a test method is used which will first be explained in detail:

Test Method

Determination of filter pack values for testing of particle fineness of pigments by filtration in the extruder.

Principle: Pigment weight related maximum pressure difference over a filter distance during a test extrusion.

Instruments/materials: Prism 16 TC Twin Screw Extruder; polyethylene powder: Riblene TR 107, MFI melt index 20; filtration element: 400 mesh, 100 mesh, 60 mesh.

Execution:

Adjustment of the extruder with the following parameters:

Cylinder diameter: 16 mm; extruder length ratio: 25:1; perforated disk: 2 mm;

nozzle: 5 mm; temperature zones: 120° C., 200° C., 230° C., 230° C., 230° C.; number of screw revolutions: 50 RPM.

Test: Prior to attaching the assembled extruder head, the filter path needs to be thoroughly cleaned. Attention must always be paid that there will never be any idle run, since blowing in of air will greatly affect the pressure value. First zero value determination. To that end, 200 grams of non-pigmented polymer powder are extruded.

The highest indicated value is noted as zero value. In the meantime, the test material is prepared. For that purpose, specifications as to material number and charge number are put on a plastic bag: 195 grams of PE powder Riblene TR107 and 5 grams of fluidized press cake/grinding formulation are weighed and mixed by hand into a homogenous mixture.

The test material must be added before the input funnel runs empty. The extrusion step is now continued. One notes here the highest indicated value as F1. Another 200 grams of non-pigmented polymer powder are now extruded, with first slowly adding a little PE material in the upper funnel and the upper conveyor screws are swept clean with the aid of a brush. It is then possible to add the rest and the highest indicated value is noted as F2. For calculation of the filter pack value, one only needs the weighed filter specimen, the zero value and the F2 value. Calculation of filter pack value ("FW") in bar per gram of pigment:

$$FW=(F2-\text{zero value})/\text{weighed sample} \times 2)[bar/g]=\text{approximately } FW=(F2-\text{zero value})/(10)[bar/g]$$

If lower pressure develops over the filter path during the subsequent second through-put with non-pigmented polymer, it is to a lesser extent clogged by pigment, the particles are, in fact, smaller and the test distance offers lower flow- and deformation resistance. As a result, the invention-specific kneading process also takes place more easily and can be employed below the melting range until plastic deformation of the polymer occurs.

The invention-specific method improves (reduces) the "filter pack value" vis-à-vis the conventional method without wet pre-grinding, depending upon selections of additions and parameters in accordance with the specified objective of approximately 0.4 to 1.5 as opposed to the conventional 1.7 to 3.1.

By already adding a little polymer powder to the high energy charging mill, even lower values could be achieved, which we are attributing, for the time being, to a more uniform texture and a more densely distributed particle size due to pre-grinding.

Further benefit of the extremely fine-particle stable grinding step is avoidance of any kind of oversize pieces, either crystalline or agglomerated, already with input into the flush kneader, which is of greatest importance with respect to manufacture of foils and fibers. To the extent desired, a nearly transparent system can also be produced, primarily with polycyclic organic pigments, as it is otherwise known pertaining to coloring agents. Another benefit of the invention-specific method is the achieved high gloss of these products which is attained by integration of the inventive pigment formulations.

With the inventive thermoplastic matrix, foils are beneficially produced containing nano-scale pigments. These foils distinguish themselves by particularly excellent and homogeneous transparency. The term "nano-scale" stands for pigments with particle size of less than 200 nm, in particular less than 100 nm, in other words those which clearly lie below the "transparency limit" of $0.47\lambda$ (with $\lambda$=wave length of the color imprint in nm).

Example 1

Product: Polyethylene-Master Batch Flush with Quinacridon Red Pigment (C.I. PR122)

To begin with, a dissolver-produced homogeneous mixture consisting of 55% quinacridon crude pigment (PR122 crude), having a purity of 81%, 0.3% palmitin/stearin acid glyceride, 1.3% sodium hydroxide, 1.1% dresignate, 3.0% oleic acid sodium salt, 4.9% 2-methyl-1-propanol, 3.8% mineral oil PKWF, 0.2% acenaphthene and 30.4% water are transferred into the receiver vessel of a laboratory high efficiency agitator ball mill. The suspension is ground for 240 minutes by recirculation method. The peripheral speed of the rotor is 6.8 m/s. The grinding chamber of the mill is equipped with 75% by volume of zirconium oxide beads (0.7 to 0.9 mm diameter) as grinding bodies. The temperature of the grinding product is 45° C.

The extremely fine grinding suspension with 44.5% pigment percentage is changed as follows to a "PE-master batch flush" during the second step: A charge of 1050 grams of grinding suspension from the first step is placed into a heatable twin-shaft kneader with Sigma kneading tools (gross volume 2.7 l) made by Lieal—corresponding to 468 grams of pure pigment. By means of 5% hydrochloric acid, the pH value is adjusted between 6.0 and 7.0. Subsequently, under kneading, the following substances are added: 150 grams LDPE granulate, 15 grams PE wax Licowax PE 520 as well as 15 grams EMA-copolymer and the system is heated to 88° C. Following appearance of the first so-called "break" (phase separation), the supernatant water is quickly decanted. Subsequently, the remaining 200 grams of the above produced pigment suspension is added under continued kneading. After buffering the pH value to 6.5-7.0 with acetic acid and, perhaps, a little liquid ammonia with addition of 100 ml of water, the mass is kneaded at 85° C. until the appearance of the second so-called "break". The supernatant water is again decanted. An additional 165 grams PE wax LicoWax PE 520 and 20 grams EMA-copolymer are added. The pH-value is adjusted to 7.2-7.5 with liquid ammonia, adding a maximum of 100 ml of water while the kneading process continues at 90° C., until the third "break".

By means of three time addition of 500 grams each of fresh water (with the third addition consisting of de-mineralized water), 30 minute kneading and removal of the supernatant water, the remaining water-soluble, now excess ingredients are dissolved from the pigment concentrate. Following withdrawal of the last portions of water at 95-100° C. under reduced pressure, the red PE master batch formulation, having a pigmentation level of 58-60%, is broken and isolated by cooling down and continued operation of the kneader shafts.

A comparison with a product of the competition, which is 45% pigmented, produces identical color saturation and identical color intensity. An invention-specific foil pre-product is already 100% dispersed on the rolled sheet tester after only 5 minutes in a matrix which is to be colored, while the competitive product requires twice as much time for this. A foil which was pigmented at 5% with this highly concentrated polymer concentrate still presents a clear, transparent red coloration without pits.

Example 2

Product: Polyethylene Master Batch Flush with Indanthron-Blue Pigment (C.I. PB 60)

First Step: High Velocity ball Mill for a grinding suspension of 45% C.I. PB 60 (indanthron-blue).

Formulation:

| | |
|---|---|
| Pigment PB 60 crude pigment or pure pigment | 45.00% |
| Dresinate X (saponified colophonium resin) | 2.60% |
| DT30 Fatty Acid | 2.40% |
| NaOH50% | 0.58% |
| Water | 49.42% |
| Defoaming agent Jagsperse EC | 0.23% |
| pH 9.0-10.00 | 100.00 | starter size = 600 grams

Grinding is done for a period of 60 minutes with the grinding product being returned by means of "zirconox" beads 0.4 to 0.7 mm; temperature at constant 52° C. The crude pigment press cake can also be used wet following moisture determination. Moisture is then added to the water balance. After the pre-grinding phase, the adjuvants based on acid derivatives are present in form of hydrolysis products.

Second Step: (Thermoplast Matrix Flush)

78 grams of polyethylene powder (LDPE) and 40 grams of polyethylene wax are weighed into an input funnel of a one liter Lieal kneader and the kneader is heated to a temperature of 80 to 95° C. until the PE phase melts. After that, 233 grams of grinding suspense PB 60 from the first step corresponding to 105 grams of dry pigment are added, followed by 3 grams of acetic acid. The kneader is turned on for approximately 15 minutes until a first water fraction separates, which is decanted. An additional 233 grams of the same grinding suspension from step 1 (45% or 105 g pigment) are then added, followed by another addition of 1 gram of acetic acid. The kneader is operated for another 25 minutes, until a second aqueous fraction separates, which is likewise decanted.

After that, one washes one time with 50 grams of slightly ammonia-alkaline water with a pH value of 7.5 to 8. Then, following any additionally required corrections to the pH value, one washes another time with 200 grams of water until a pH value is reached of 6.5 to 7.0. The mass is now dried under vacuum or by means of air flow with turned-on kneader heating. After the kneader product has dried, the cooling water of the kneader is turned on and the kneader shafts are operated for approximately 15 minutes. The kneader product should become stiff and begin to break while the PE-kneader product cools down. At that point in time, the kneader is turned off and allowed to totally cool down. After removal, the kneader product is broken into small pieces and dried in an open drier. Finally, micronization is done in a pinned disk mill.

One obtains a highly pigmented polymer (64%) with a PE percentage of 36%.

Application: With a thickness of 0.1 mm, one can draw a blue, transparent foil, using up to 9% of the above produced master batch material, which does not present any pits.

Further details in regard to the preceding examples in accordance with the invention:

Testing of examples was performed in various laboratories of the applicant. Instead of the LDPE granulate used in these examples, other polymers may be employed, in particular HDPE. In addition, it is possible, within the scope of the flush procedure, to employ PVC, EMA, PP, PS, PAN or Diolen®. In difference to the above specified example, it is possible to use an extruder instead of the twin shaft kneader, in particular a contra-rotating dual screw extruder.

With declining salt concentration during the final phase of the flush, the boiling temperature of the "break" water drops (of the decantate). With the use of appropriate adjuvant selection, kneader temperature need, however, not be raised to the melting temperature of the respective thermoplastic mixture. Temperatures around 100° C. suffice in order to still achieve flush successes by way of cold deformation. Only towards the end, the temperature should briefly be raised to the melting range during drying. During cool-down, break-up of the material occurs only below 90° C.

Another improvement of the method specified in the examples consists in that the pH-value is adjusted in such manner in the flush-process that at least part of the high-molecular additives which enhance the plasticity of the matrix as well as the affinity between pigment surface and matrix, will partially precipitate as acids, while partially still remaining on the pigment and are flushed out in subsequent pH-controlled washing steps. The pH-value for precipitation of poly-electrolytes and adjuvants on the pigment should range between 2 and 5, preferably between 2.8 and 4.5.

In order to convert the excess materials into a water-soluble form, the examples can be modified in that the pH-value in one of the washing steps during flushing is adjusted to approximately 8 to 10 by means of a base, such as concentrated liquid ammonia or caustic soda solution. This has the result that excess adjuvants not adhering to the pigment are washed out, so that all carbonic acids are washed out as salts. Subsequent washing, however, requires for the named examples a larger amount of water for neutral washing, preferably with de-mineralized water.

In regard to the first step, i.e. the pre-grinding step, the mentioned exemplary embodiments can be supplemented in that the highly energetic pre-grinding is executed in such manner so as to result in a particle size of at least smaller than 200 nm average grain diameter, involving a lean distribution curve, with half-value width of less than 100, preferably less than 50 nm. Another improvement with respect to the quality of the end products can be obtained by lowering the upper limit of the average particle size of the pigments to 150 nm or 120 nm. Products of even higher quality can be produced if the particle size is less than 100 nm.

Without wanting to commit to the following theory, it is assumed that in the realization of the present invention, the percentage of organized crystal structures and also of aligned particle shapes, in particular below 150 nm of average particle diameter, declines with continued reduction of average particle size or with higher percentage of fines and that crystal structure therefore only exerts a secondary, although not to be totally overlooked influence upon coloration. It is assumed that said amorphicity represents, in addition to having an energy lowering effect on nano-particular pigments, an aspect of the high tendency to form new crystals during and after fine-grinding. This tendency to form new crystals is obviously suppressed by the grinding suspension employed according to the invention and said state is being stabilized, at least with respect to the further processing process.

The invention claimed is:

1. A method for the production of a pigmented thermoplastic material, characterized in that in a first step an aqueous suspension, presenting a solid matter contents of approximately 10 to 75% by weight, which contains a flow enhancer in form of a dissolved salt and the pigment is ground under alkaline conditions in a high-energy feed mill with grinding bodies having a diameter of 0.2 to 2 mm, and the obtained ground product is converted with a thermoplastic material into the pigmented thermoplastic material during a second step, making use of a flush process performed in a kneading device or extruder, at increased temperature and a pH value of initially 7 or less.

2. The method according to claim 1, characterized in that the pH-value is adjusted during the second step to approximately 2 to 6.

3. The method according to claim 2, characterized in that the pH-value is adjusted toward the end of the second step to approximately 8 to 10 by means of a base in order to remove incorporated excess species in water-soluble form.

4. The method according to claim 1, characterized in that a kneading device is utilized in the second step and the ground product from the first step is introduced in several charges into the kneader, whereby after each charge, with onset of phase separation, the excess aqueous phase is decanted.

5. The method according to claim 4, characterized in that the temperature of the material contained within the kneading device is raised in order to remove any remaining, more difficult to dissolve, interfering substances from the pigmented thermoplastic material.

6. The method according to claim 1, characterized in that during the second step, or the flush process, the temperature is adjusted to 100° C. or below.

7. The method according to claim 1, characterized in that as thermoplastic material, polyethylene (PE) is used, and selected from high density polyethylene (HDPE) or low density polyethylene (LDPE), polypropylene (PP), polyvinyl-chloride (PVC), ethylene-methacryl acid ester co-polymer (EMA), polystyrene (PS), polyacryl-nitrile (PAN) or polyester (Diolen®).

8. The method according to claim 1, characterized in that the flush process is performed with use of a kneader, under reduced pressure.

9. The method according to claim 1, wherein the pigment is an untreated crude pigment.

10. The method according to claim 1, characterized in that an organic pigment is employed as an untreated crude pigment.

11. The method according to claim 1, characterized in that the solid matter content percentage is adjusted during the first step to approximately 30 to 75 percent by weight.

12. The method according to claim 1, characterized in that during grinding in the first step, the particle size of the pigment is adjusted to smaller than 150 nm.

13. The method according to claim 1, characterized in that sodium lauryl sulfonate is employed as a flow enhancer during the first step.

14. The method according to claim 1, characterized in that esters and glycerides are used for method optimization as plasticity enhancers, which are hydrolyzed in controlled fashion by managing the pH value during the process and are thus being modified in their effect.

15. The method according to claim 1, characterized in that further adjuvants for control of process are utilized.

16. The method according to claim 1, characterized in that flow enhancers in the aqueous suspension are adjusted during the first step to a concentration of 0.2 to 20% by weight.

17. The method according to a claim 1, characterized in that part of the thermoplastic material to be pigmented is already ground together with the pigment in the ball mill during the first step to a common average grain diameter of 20 to 200 nm.

18. The method according to claim 1, wherein said pigment is crude, such as not yet application-ready pigment or highly amorphous pigment or mixtures of several of such type of crude pigments.

19. The method according to claim 1, characterized in that the pigment concentration in the aqueous suspension during the first step is adjusted in such manner that with addition of the thermoplastic material during the second step, a ratio of 1 part by weight of thermoplastic material to approximately 0.2 to 4 parts by weight pigment is achieved.

* * * * *